United States Patent [19] [11] Patent Number: 5,468,117
Lobko et al. [45] Date of Patent: Nov. 21, 1995

[54] HEATING OF TANK CAR WALLS FOR EJECTING FROZEN OR CONGEALED CARGO

[76] Inventors: Mikhail A. Lobko; Irina P. Lobko, both of 12372 Bennington Pl., Apt. 24, St. Louis, Mo. 63146

[21] Appl. No.: 303,235

[22] Filed: Sep. 8, 1994

[51] Int. Cl.$^6$ ..................... B65G 67/24
[52] U.S. Cl. ............ 414/786; 105/451; 141/1; 141/11; 141/82; 222/1; 222/146.2; 222/146.5; 222/394; 414/344; 414/396
[58] Field of Search ............ 414/786, 395, 414/396, 344; 105/451; 141/1, 11, 12, 23, 82; 222/1, 146.2, 146.5, 389, 386, 394

[56] References Cited

U.S. PATENT DOCUMENTS

| 1,275,708 | 8/1918 | Lemay | 105/451 X |
| 3,078,004 | 2/1963 | Randolph | 105/358 X |
| 3,176,764 | 4/1965 | Barbera | 105/451 X |
| 4,060,180 | 11/1977 | Wieland, Jr. | 222/394 X |
| 4,065,034 | 12/1977 | Callan | 222/146.5 |
| 4,515,189 | 5/1985 | Mowatt-Larssen | 141/82 X |
| 4,811,863 | 3/1989 | Claassen | 222/146.5 |

*Primary Examiner*—Kevin P. Shaver
*Attorney, Agent, or Firm*—Patrick D. Kelly

[57] ABSTRACT

A device and method for unloading frozen or congealed crude oil, oil product, or chemical cargo from a railway or highway tank car. A brief heating step uses the high thermal conductivity of metal tank walls, and the low thermal conductivity of oil or chemical cargos, to thaw a relatively thin band of cargo adjacent to the longitudinal tank wall. This thin band of thawed liquid lubricates the remainder of the plug, which remains solid, so that the plug can be mechanically ejected into a receiving trough positioned at the same height as the emerging plug; this avoids the requirement of completely thawing the frozen cargo before it can be pumped out. A tank car is disclosed having at least one end wall that can be opened, allowing a frozen or congealed mass to be physically ejected from the tank as a solidified plug. The ejection mechanism can involve pneumatic or hydraulic pressure which moves an interior wall along the length of the cylinder, or a large piston-type movable wall coupled to one or more driving rods. The brief heating step uses heating belts wrapped around the tank, passage of steam or hot water through a space between two cylindrical walls in a double-walled tank, or a crane-supported device which can be lowered over a tank. After ejection, the plug can be thawed, sliced, or otherwise prepared for burning, refining, repackaging, or any other use. The heating devices can be used in conjunction with conventional internal steam coils, or with tank cars having rusted or broken steam coils, to speed up a conventional thawing operation.

6 Claims, 5 Drawing Sheets

HEATING OF TANK CAR WALLS FOR EJECTING FROZEN OR CONGEALED CARGO

BACKGROUND OF THE INVENTION

This invention is in the mechanical field and relates to tank cars used to transport oil on railroads or highways.

Railroads and highways are widely used in many nations to haul crude oil and oil products to and from pipeline terminals, and to locations that are not served by major pipeline systems. This invention is limited to the over-land hauling of oil, in bulk (i.e., oil loaded directly into a cargo tank of a tank car for hauling; this excludes oil subdivided into other containers such as barrels or cans, and oil used by a transport device for lubrication or fuel). As used herein, all terms such as hauling, transport, tanks, tank cars, or cargo, are limited to transportation across land, on railroads or on highways or other surface roads. Such terms do not involve or include water-borne shipping, and they do not involve or include pumping of oil through pipelines.

Hauling of crude oil or refined products across railways or highways requires special types of rolling tank containers, referred to herein as a "tank car" regardless of whether it is adapted for railway or highway use (in some countries, tank cars are referred to as cisterns). A typical tank car for use on a railway comprises a cylindrical steel container with one or more inlet/outlet ports on the top and a drainage port on the bottom, mounted on a chassis that comprises steel railroad wheels and conventional railway couplings at both ends, so that the tank car can be added or inserted into a line of train cars. Railway tank cars may have certain types of fixed piping systems, but they usually do not carry pumps or flexible hoses, since their cargoes are loaded and unloaded only at railroad terminals, which provide the necessary pumping equipment.

Typical railway tank cars used in America are slightly less than 15 feet tall (to allow travel beneath overpasses) and 11 feet wide, and usually have a cargo capacity ranging from about 12 to about 22 thousand gallons, depending on the length of a specific tank car. Accordingly, railway tank cars are not meant to serve small facilities; instead, they're used to transport oil only to large industrial facilities with rail terminals, such as oil refineries or pumping stations, electric power generating plants, or very large factories.

Extensive additional information on the design of railway tank cars is provided in Section C of the *Manual of Standards and Recommended Practices*, issued by the Assn. of American Railroads (AAR, Washington, DC). Another illustrated reference work, available in many libraries, is the *Car and Locomotive Cyclopedia* (compiled by AAR and published by Simmons-Boardman, New York, 1974).

A tank car for use on a highway or other surface road (sometimes called a tank trailer) provides a similar cylindrical tank (which are usually smaller than on railroad tank cars), a chassis, rear wheels with rubber tires, and an attachment device in the front that allows the trailer unit to be coupled to a conventional diesel highway tractor unit. Unlike railway tank cars, a highway-type tank car is usually provided with one or more flexible loading hoses and a pump, which can be driven either by a gasoline or diesel motor carried on the trailer, or by a mechanical connection that allows the main engine of the tractor unit to drive the pump. By carrying their own pumps and hoses for loading or unloading cargo, highway tank cars can serve small facilities that do not have pumping and handling devices.

Some tanks used in tank cars are not completely cylindrical. Highway tank cars in particular often have elliptical cross-sections for better weight distribution, since a lower center of gravity reduces the risk of rollover in an accident. Some tanks also have slanted bottom surfaces to promote drainage, or sump depressions on the bottom for collecting sediments.

Freezing and Congealing

One problem that interferes with hauling of crude oil and oil products (and certain types of other chemicals) involves freezing or congealing of the oil or chemical inside the tank. This is an important wintertime problem in much of the continental US, Europe, and Asia, and it becomes even more severe in arctic and near-arctic regions such as in Alaska, Canada, Russia, and Scandinavia. Most grades of crude oil, if exposed to cold, will either congeal or suffer from high levels of condensation of the heavy fractions, creating a sticky, difficult-to-remove waxy or asphalt-like accumulation inside the tanks. In addition, any relatively heavy and thick oil product (such as diesel fuel and heating oil) tends to congeal in cold weather. Since crude oil and heavy products present the most widespread difficulties, most of the discussion below focuses on those types of cargo. However, it should also be noted that lighter and thinner oil products (such as gasoline, kerosene, or jet fuel) can also freeze or congeal at very cold temperatures; accordingly, the tank cars described herein can also be used to haul such light products, particularly under arctic or near-arctic conditions.

The problems of freezing or congealing are aggravated by the loading and hauling conditions that are typically used. The crude oil or oil product is loaded into a non-insulated steel tank, and the oil usually sits in the tank, often for several days and nights, while the tank is openly exposed to outside weather. While the oil is in the tank, the steel walls serve as a fairly efficient heat exchanger, and convection currents inside the tank interact with the steel walls and with radiant heat loss (mostly infrared radiation) to promote the loss of heat from the oil, causing the oil to approach or reach the cold ambient temperatures outside the tank. In many situations, these chilling effects can freeze or congeal the entire load; in other situations, a thick region surrounding the cargo can be thoroughly solidified or congealed while some portion in the center remains somewhat less solidified or congealed.

Due to their chemical makeup, crude oil, oil products, and many chemicals usually do not freeze into hard crystals resembling ice; instead, they usually create a solid or semi-solid mass with a thickness and viscosity somewhere between cold molasses and hard asphalt. For convenience, terms such as "congealed" or "solidified" are used broadly herein to include any of the following: (1) freezing, which implies creation of a completely solid mass; (2) increasing the viscosity of crude oil or an oil product or chemical to an extent that renders pumping of the highly viscous fluid through a hose or pipe very difficult or impossible, or (3) creating condensed or solid deposits which cannot be removed from the tank by conventional drainage or pumping of the cargo.

Since congealed crude oil, oil products, or chemicals can be very difficult or impossible to pump using conventional pumps, hoses, and pipes, cold weather often requires special steps to be taken before the cargo can be unloaded. In America, most railway tank cars are provided with steam coils, positioned along the bottom of the interior surface of the tank. If the cargo is too cold to pump out easily, then steam hoses are coupled to exterior fittings positioned around the tank, and steam supplied from a boiler or other facility is pumped through the coils until it adequately thaws or reduces the viscosity of the cargo. This can be a time-consuming and relatively inefficient operation, since most cold congealed fluids do not transmit heat very well from the regions adjacent to the steam coils all the way through the rest of the cargo.

In addition, if a tank car is not equipped with internal steam coils, or if the coils have rusted or been broken or damaged in an old or damaged tank car, it can be much more difficult and time-consuming to thaw a congealed cargo. It can require, for example, moving a loaded tank car into a heated shed, garage, or warehouse, and keeping it there until the oil has adequately thawed, which can take several days. This is a slow process; it wastes heat and energy, and it can render tank cars useless in cold climates even when every other part in the tank car (other than the steam coils) is working properly.

Various items of prior art have been identified which are peripherally related to this invention, but none disclose or suggest the teachings herein. For example, U.S. Pat. No. 3,078,004 (Randolph 1963) discloses an double-walled insulated railroad tank car, which conceivably might be useful for keeping a load of oil relatively warm, to prevent the oil from congealing in cold weather. However, that disclosure relates to the transportation of liquified gases (such as liquid nitrogen or oxygen) which must be kept at very cold temperatures.

Accordingly, one object of this invention is to provide a modified tank car that can be used to efficiently unload congealed oil or chemicals in cold weather.

Another object of this invention is to disclose a method of unloading congealed oil or chemicals from a tank car outdoors, regardless of how cold or adverse the ambient weather may be.

Another object of this invention is to disclose a method of unloading frozen or congealed oil from a tank car, in a manner which is more rapid and energy-efficient than prior methods.

Another object of this invention is to disclose a method of supplementing the heating activity of conventional steam coils mounted inside conventional tank cars.

SUMMARY OF THE INVENTION

This invention discloses a device and method for using the high thermal conductivity of metal tank walls, and the low thermal conductivity of oil or chemical cargos, to unload frozen or congealed crude oil, oil product, or chemical cargo from a railway or highway tank car. The device comprises a tank car having a roughly cylindrical tank with at least one end wall that can be opened, allowing a frozen or congealed mass to be physically ejected from the tank as a solidified plug. This avoids the requirement of completely thawing the frozen cargo before it can be pumped out. The ejection mechanism can involve pneumatic or hydraulic pressure which moves an interior wall along the length of the cylinder, or a large piston-type movable wall coupled to one or more driving rods. The method of this invention comprises brief heating of the longitudinal cylindrical wall of the tank, using means such as heating belts wrapped around the tank, passing steam or hot water through a space between two cylindrical walls in a double-walled tank, or a cowl-type device which can be lowered over a tank. The brief heating step thaws a relatively thin band of cargo adjacent to the longitudinal tank wall. This thin band of thawed liquid lubricates the remainder of the plug, which remains solid, so that the plug can be mechanically ejected into a receiving trough positioned at the same height as the emerging plug. After ejection, the plug can be thawed, sliced, or otherwise prepared for burning, refining, repackaging, or any other use. The heating devices disclosed herein also can be used in conjunction with conventional internal steam coils, or with tank cars having rusted or broken steam coils, to speed up a conventional thawing operation.

DESCRIPTION OF THE PREFERRED EMBODIMENTS

Figure 1:
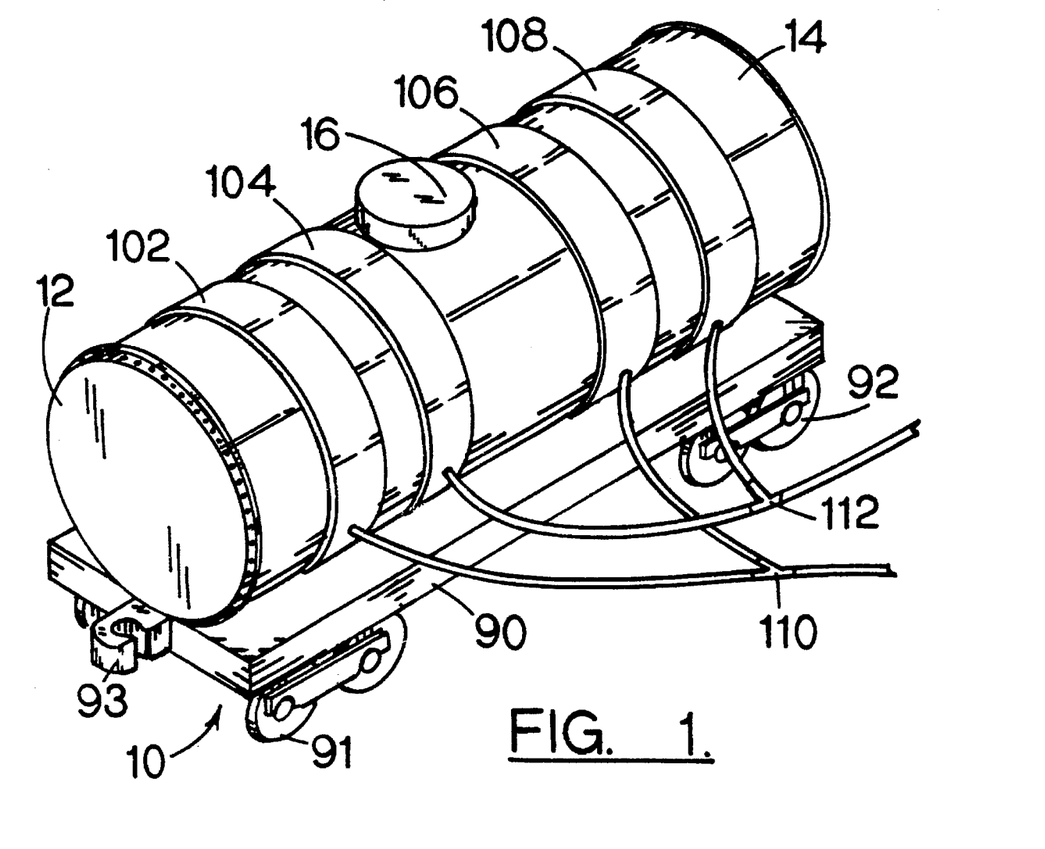
FIG. 1 is a perspective view showing a tank car with several heating belts strapped around it to heat the exterior of the cylindrical wall for unloading, with hose connections to circulate steam or hot water through the heating belts.

Referring to the figures, FIG. 1 is a perspective view of a conventional railway tank car 10, which carries a cargo tank 12 comprising a longitudinal (cylindrical) wall 14, a first end wall 16, a second end wall 18, and an inlet 20. In the figure, four heating belts 102–108 are strapped around the tank 12 at spaced locations along the length of longitudinal wall 14. In addition to cargo tank 12, the tank car 10 comprises a chassis 90, wheel assemblies 91 and 92, and car couplers 93 at both ends of chassis 90. The loading inlet, chassis, wheel assemblies, and car coupler assemblies are shown in simplified form; detailed drawings of such components, which are conventional and are not directly affected by this invention, are available in reference texts such as the *Manual of*

*Standards and Recommended Practices* and the *Car and Locomotive Cyclopedia* (both cited above).

Heating belts 102–108 are designed to be placed around and pressed against the longitudinal wall 14 of tank 12, to facilitate unloading of frozen or congealed oil or chemical cargo as described below. Most tank cars will not need to be structurally modified to allow use of heating belts as described herein; these belts are designed for retrofitting onto existing tank cars with minimal expense. However, to facilitate simple and prompt installation and removal, small hooks or other devices can be welded to or otherwise provided at spaced locations along the tank or chassis, to facilitate the securing of heating belts to the tank. If desired, the heating belts can be wrapped around a tank with the aid of springs, elastic straps, or other mechanical devices that exert tension on the heating belts, to ensure close contact between the belts and the tank, to promote efficient heat transfer.

If desired, the heating belts can be removed as soon as an unloading operation is finished, and they will not need to be carried around by or with a tank car. This will minimize wear, degradation, and exposure to rain, snow, hail, direct sunlight, air pollutants, and other potentially harsh conditions during transport of the tank car; it will also allow a single set of belts to be used for any number of tank cars. Alternately, heating belts can be permanently installed on tank cars, if made of suitably durable materials; the choice of permanent or temporary installation is an economic decision.

Figure 2:
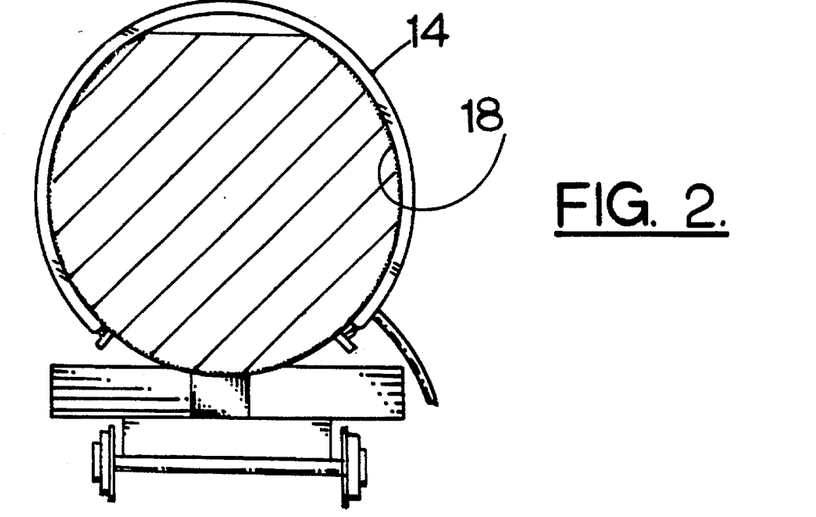
FIG. 2 is a cutaway end-view showing one of the heating belts strapped around the accessible portions of the tank wall above the railcar chassis.

In many tank cars, it will not be possible to wrap heating belts around the entire circumference of a tank 12, due to structural components used to secure the tank to the chassis 90. However, due to the high heat-conducting properties of steel tank walls and the nature of this invention, direct contact of the heating belts around the entire circumference of tank wall 14 is not necessary. Contact around a majority of the circumference of longitudinal wall 14 will be sufficient to melt a relatively thin layer of oil (shown by dotted line 28 in FIG. 2) that contacts or is immediately adjacent to the interior surface of wall 14. This allows a preferred mode of use, which involves melting only a thin layer of oil next to the longitudinal wall, which allows the remainder of the frozen or congealed cargo to be ejected as a solid plug through an end opening.

If desired, there are various ways to ensure additional heating of the bottom region of the tank in some tank cars. For example, if a tank has been lowered into a rectangular opening in the center of a railcar chassis, either for stability or to provide access to one or more components on the bottom of the tank, one or more bottom surfaces may be accessible, for placement of a bottom-mounted heating belt or other heating device (if the tank car is not already equipped with internal steam coils in the bottom of the tank).

Figure 3:
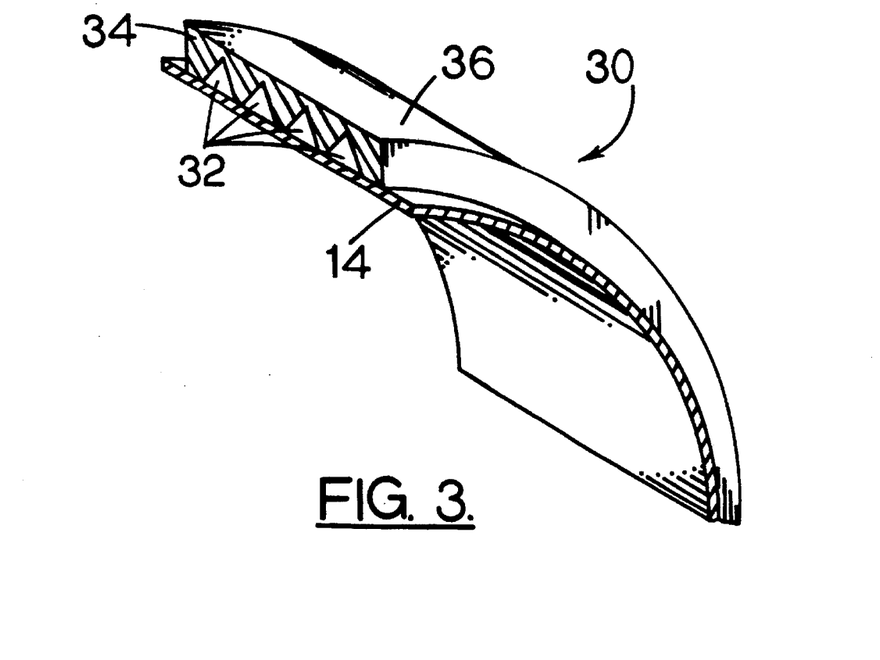
FIG. 3 is a perspective cutaway view showing a heating belt with channels that allow steam or hot water to directly contact and heat the cylindrical wall of a tank car.

A cutaway perspective view of one preferred embodiment of a heating belt 30 is shown in FIG. 3. This embodiment allows a hot fluid (presumably steam or hot water) to be pumped through a plurality of flow channels 32 which have been cut, molded, or otherwise provided in a suitable water-resistant heat-insulating material 34. A closed-cell foam rubber type of material is generally preferred, since it provides flexibility, which can facilitate installation and removal of the belts. Alternately, a relatively stiff material can be used if desired, if each belt is made by coupling together several sections, since most railway tank cars have relatively consistent external diameters (the length of the tank is the main variable that determines the capacities of different tanks). This can be done either by using a styrofoam-type material to provide the insulation, or by providing an additional layer of insulating material (such as an insulating foam) on the exterior surface 36 of belt section made of aluminum or any other relatively lightweight material.

Figure 4:
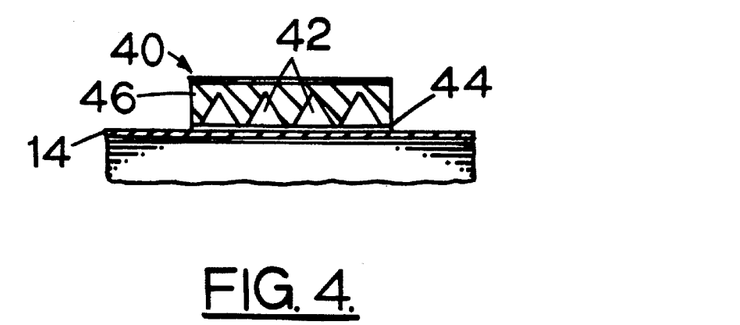
FIG. 4 is a cutaway end view of an alternate type of heating belt which is watertight, wherein the steam or hot water is held inside the belt channels by a thin heat-conductive metallic layer that is pressed against the cylindrical tank wall.

In the heating belt design shown in FIG. 3, the hot fluid passing through flow channels 32 directly contacts the exterior surface of the tank wall 14. In an alternate design, shown in FIG. 4, a hot fluid passes through watertight channels 42 in heating belt 40, which are created by securely attaching a thin layer 44 of a heat-conducting material (such as a moderately flexible thin sheet or a highly flexible heavy foil layer made of copper, aluminum, steel, or any other suitable metal, alloy, or other material) to interior ridges of the channeled body 46 of belt 40. A secure and steam-resistant attachment of layer 44 to body 46 can be provided by soldering or brazing, if the heat-conducting layer is metallic, or by other methods such as strong heat-resistant waterproof glue.

Either type of fluid-flow heating belt (30 or 40) can be used to provide the externally spaced belts 102-108 shown in FIG. 1, which also shows hoses 110 and 112 which are used to circulate steam, hot water, or other heated liquid through the heating belts. Two additional identical hoses are also provided, on the other side of the tank car (not shown). In the arrangement shown in FIG. 1, hose 110 is a supply hose carrying steam to belts 102 and 104; a Y-branched hose junction can be used for two belts, or a manifold device can be used if a larger number of belts is to be supplied (for example, a single manifold can provide steam to two belts on each side of the tank, for a total of four belts). Hose 112 is a drainage hose, which carries away substantially colder steam or water after passage around the tank. This arrangement is similar to a "counter-flow" heat exchanger; the heated fluid flows in opposite directions in adjacent belts, to evenly distribute the areas of highest heat transfer around the surface of the tank, thereby providing more evenly distributed heating of the tank wall 14.

Figure 5:
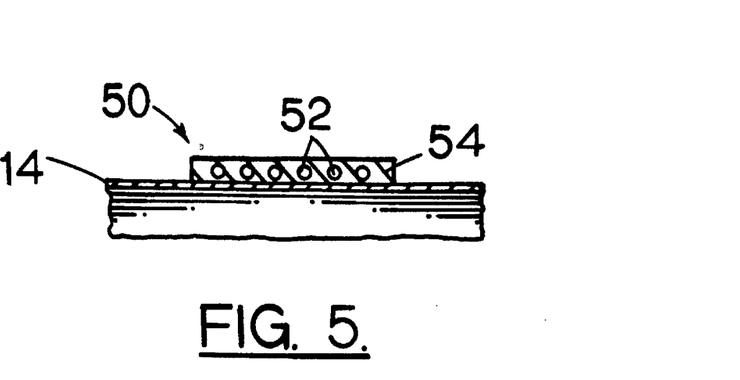
FIG. 5 is a cutaway end view of an alternate type of heating belt comprising electrical heating elements.

In yet another heating belt embodiment shown in FIG. 5, heating energy is provided by passing an electrical current through electrically resistive heating elements 52 in heating belt 50, which is pressed against tank wall 14. To increase the durability of the belts, the electrical heating elements can be embedded in a body 54 made of a suitable matrix which conducts heat but not electricity, such as a ceramic or polymer. Alternately, the resistive heating elements 52 can be placed on the interior surface of a heating belt 50, so that they will more directly contact and impart heat to the tank wall 14, provided that care is taken to ensure that electrical short-circuits do not arise between the heating elements and the steel in the tank wall 14. For example, since electrical heating elements can be relatively lightweight and covered by relatively cheap, highly durable materials, an electrical heating belt 50 can be permanently installed in an effective and economic manner on a tank car.

Although one of the uses of the heating belts described herein is for providing a method of ejecting solidified oil plugs, as described below, it should also be noted that heating belts as disclosed above can also be used with conventional tank cars, particularly tank cars having non-cylindrical interior surfaces such as sloped bottoms, sump basins, and interior steam coils. Unless an accomodating bottom device is inserted into the tank, as noted below, these interior surface irregularities can render it difficult or impossible to eject a solidified plug out of the tank by pushing. Accordingly, exterior heating belts as described herein can be used in conjunction with internal steam coils, to speed up the heating process, increase efficiency, and minimize overheating of any localized zones when a load of frozen or congealed must be completely thawed before it can be pumped out of the tank car.

Figure 6:
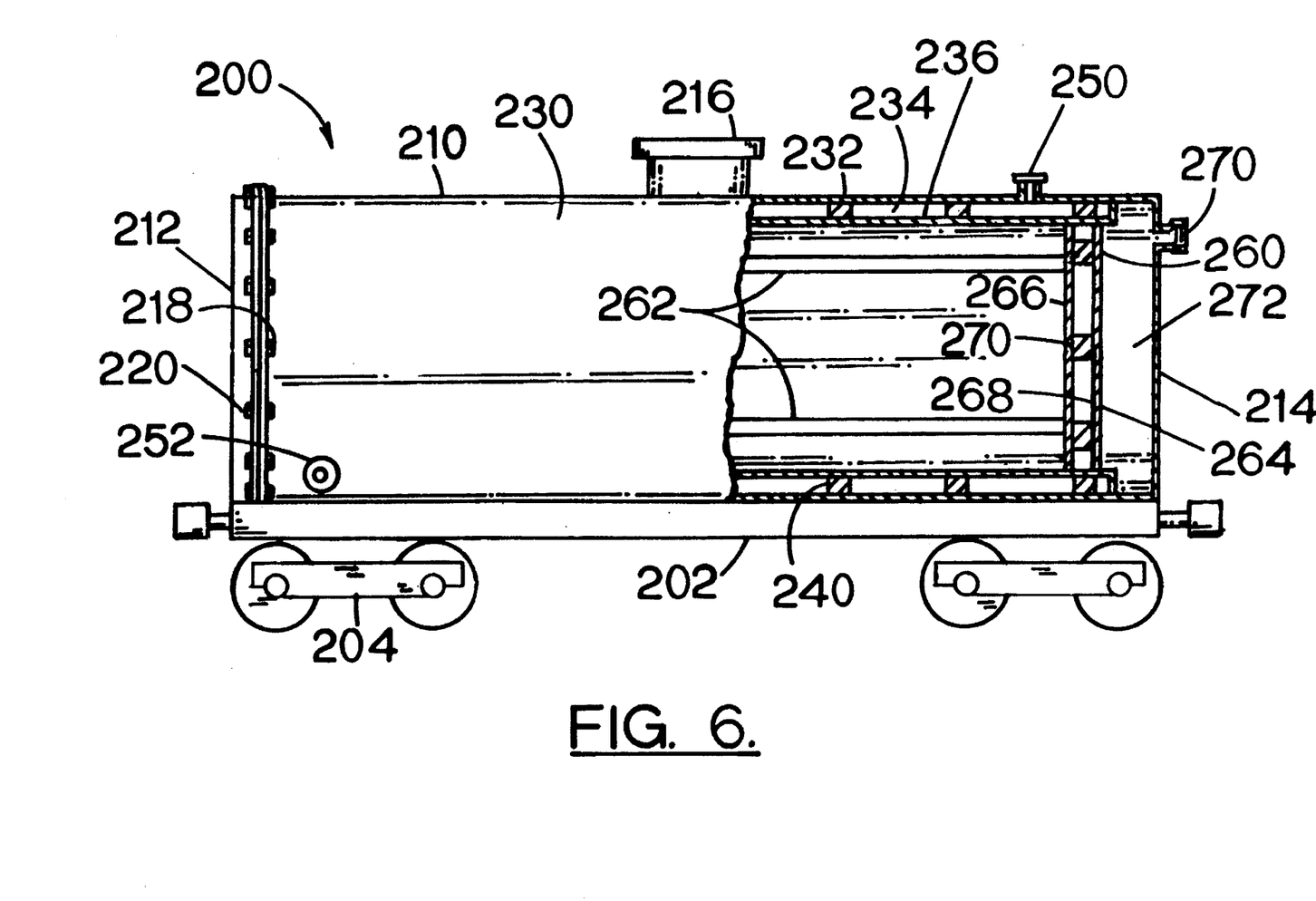
FIG. 6 is a side cutaway view of a double-walled tank car with a cylindrical annulus for passage of steam or hot water. This figure also shows an end wall that can be opened to eject a solidified plug of cold congealed oil; hydraulic or pneumatic pressure is used to drive a movable internal piston-type wall down the length of the tank, to eject the solidified oil plug through the open end wall.
Figure 7:
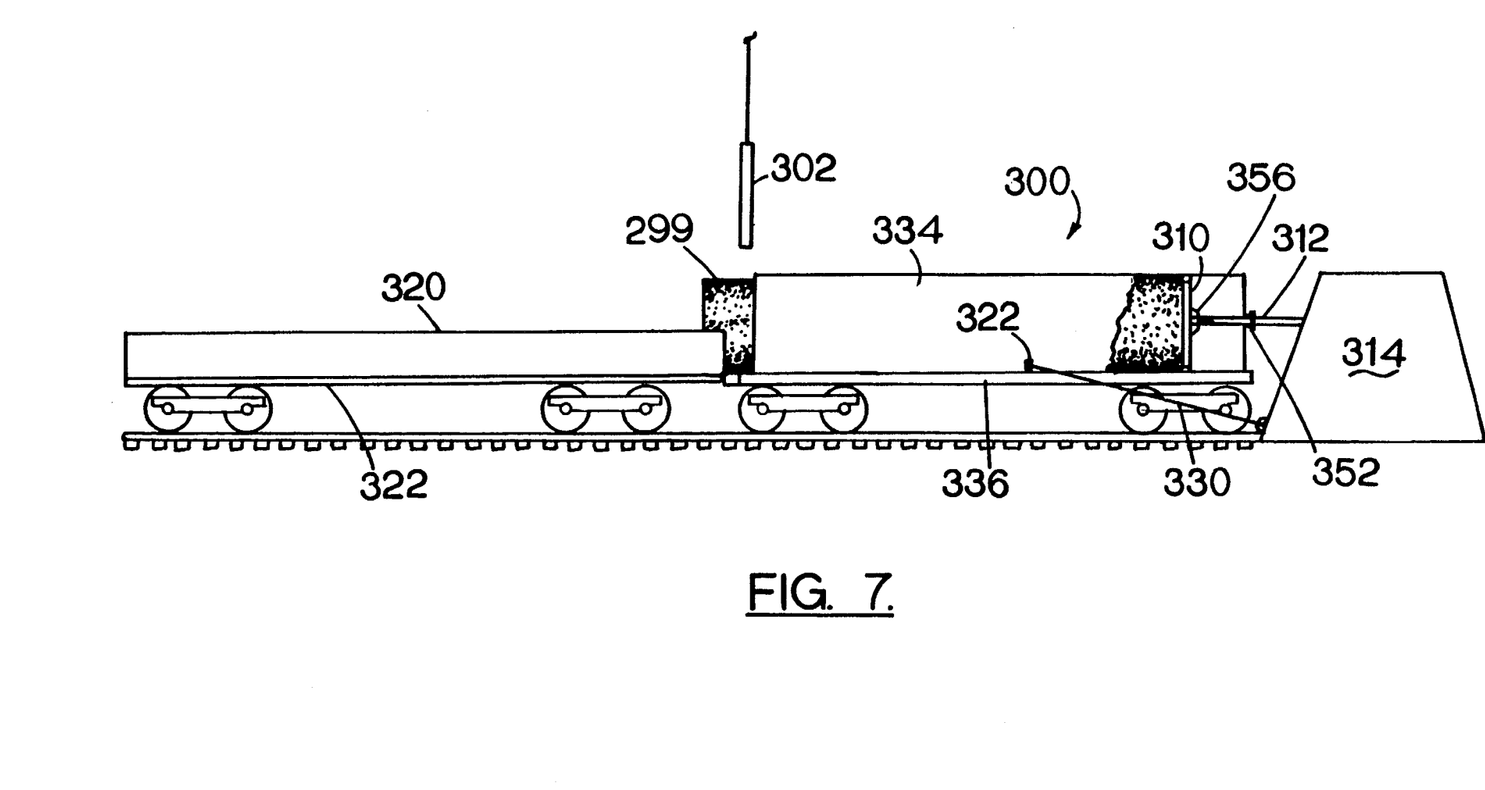
FIG. 7 is a side cutaway view of a railroad tank car in which one tank end can be opened to eject a solidified oil plug, and in which a second tank end has an orifice that can be opened to allow passage of a piston-type movable wall driven by a stationary external driver, using a diameter pipe having a substantial diameter and a threaded end. This figure also shows a receiving trough to receive the plug being ejected from the tank car.

Another preferred embodiment, shown in FIG. 6, uses a double-walled tank car 200, having chassis 202 and wheel assemblies 204. The tank assembly 210 comprises an end wall 12 which can be opened and swung out of the way if mounted on hinges (or lifted away as shown in FIG. 7, using cables coupled to a crane or derrick). Tank assembly 210 in FIG. 6 also comprises a second end wall 214 (which remains closed in the illustrated configuration) at the opposite end, a loading port 216, and a cylindrical wall assembly 230. Except during unloading, the removable end wall 212 is secured to the tank assembly 210 in a watertight (and oiltight) manner using threaded bolts 218 and nuts 220 (or other suitable attachment devices such as clamps, if desired) spaced around the periphery of the end wall 212.

As shown in the cutaway portion of FIG. 6, the cylindrical wall assembly 230 comprises a double-walled cylinder, with outer or exterior cylindrical wall 232 separated by an annular space 234 from inner cylindrical wall 236. The inner wall 236 creates cargo compartment 238. When the cargo compartment 238 is loaded through loading port 216, the annular space 234 is not filled with oil. Instead, the empty annulus 234 between the walls 232 and 236 is maintained by supports 240, which can be solid posts with any desired cross-section (such as circular, square, or angled). If desired, supports 240 can be shaped to function as baffles, to direct the flow of hot fluid through the annulus 234 in a flow pattern that promotes evenly distributed heating of the inner wall 236. Optimal sizing and spacing of the supports will vary depending on the size and weight of the tank, and can be determined for any size tank using conventional engineering design techniques.

The exterior cylindrical wall 232 does not need to be made of heavy steel, and it does not need to withstand the weight of the cargo; it merely will enclose heated fluid for a brief period, during unloading of congealed cargo. Accordingly, exterior cylindrical wall 232 can be made of a relatively thin sheet of steel, aluminum, or even a plastic-type material, so long as adequate structural supports are provided between chassis 202 and the load-bearing inner wall 36, which must be made of sufficiently heavy steel or other metal.

At a loading facility, warm crude oil or a refined oil product or chemical, in pumpable liquid form, is loaded into the cargo compartment 238. During transport and/or storage in cold conditions, the oil loses its heat and may congeal into a solidified mass. If the oil is still in pumpable liquid form when it arrives at its destination, it can be unloaded from the cargo compartment 238 using conventional pumping equipment. However, if the oil has congealed to a point where it cannot be unloaded by conventional pumping, an alternate approach will be required.

To remove solidified cargo from tank car 200, end wall 212 is opened by removing nuts 220 from threaded bolts 218 and either swinging the door away, if hinges are provided, or lifted the door away using a crane or hoisting system provided at the unloading terminal, using gripping hooks or other devices coupled to chains or cables. The gripping devices from a crane or hoist can be coupled to-hooks, eyes, or other gripping attachments permanently mounted on end wall 212.

After the end wall 212 has been fully opened, an intact plug 299 of cold solidified cargo (shown in FIG. 7) is ejected from the tank assembly 210 by pushing it out through the open end, as described below. After ejection of the solidified plug 299, which empties cargo compartment 238, the end wall 212 is repositioned and secured once again to the tank assembly 210 in a watertight manner using the bolts 218 and nuts 220, so the tank car will be ready to receive the next load of oil.

Immediately before the solidified plug 299 is ejected from the tank assembly 210, a heated fluid such as steam or hot water is passed through the annulus 234. The hot fluid enters the annulus 234 through annulus entry port 250. After passage through the annulus, the hot fluid exits the annulus 34 through annulus exit port 252. If the supports 240 do not provide a baffle system to guide and direct the flow of heated fluid inside the annulus in a desired manner, the exit port 52 preferably should be positioned at the opposite end of the tank and on the opposite side, to promote maximal contact between the hot fluid and the inner cylindrical wall 236. Alternately, if baffles are provided inside annulus 234 to control the flow path of the hot fluid, the entry and exit ports 250 and 252 can be positioned at any desired locations.

At facilities that do not have receiving troughs or other such equipment as described below, or when tank cars are used that do have non-cylindrical walls or obstructions that prevent ejection of a solid plug, the wall-heating systems described herein can be used to thaw the entire cargo to a point where the cargo can be pumped out without requiring an end wall to be opened. This method of thawing is faster and makes more efficient use of heat and fuel, than thawing procedures which rely solely on steam coils or housing a cold tank car in a heated shed or warehouse until thawing is complete.

However, the solid plug ejection system is faster and more efficient if the receiving facility is properly equipped with a trough or similar device designed for receiving a solid plug of frozen cargo. When such facilities are available, a sufficient quantity of steam, hot water, or other hot fluid is passed through annulus 234 to cause thawing of a think layer of oil immediately adjacent to the inner wall 236. This partial thawing creates a thin band of fluid lubrication between the still-cold solid plug 299 and the inner wall 236. When the end wall 212 is opened, the solidified oil plug 299 can pushed out of the tank assembly 210, through the open end.

The ejection step can be carried out using any of several mechanisms. In one preferred embodiment, ejection of the solid plug 299 is accomplished using hydraulic or pneumatic pressure to drive a movable wall 260 along a set of tracks 262 mounted inside the cylindrical inner wall 236. This is done by coupling a hose carrying pressurized air or other fluid to a threaded or quick-coupling pressure inlet 270 which passes through the non-openable end wall 214. The air or fluid that enters through fitting 270 will fill pressure space 272, and will exert pressure against the back side 264 of movable wall 260. The pressure required to eject a solidified oil plug does not have to be great; for example, since a movable circular wall with a 10 foot diameter has a surface area of nearly 80 square feet (which equals 11,300 square inches), an internal pressure of only 2 pounds per square inch (psi) above atmospheric pressure will exert a total force of over 22,000 pounds against the movable wall.

The pressurized air or hydraulic fluid does not enter annular space 234. The annulus 234, which normally will be filled with steam or hot water during unloading, is kept separate from the pressure space 272 by means of an annular plate 274, which is welded into the ring between outer wall 232 and inner wall 236.

As wall 260 moves down the length of the cylindrical tank, pushing the solidified oil plug 299 as it moves, the thickness of the wall 260 (shown in FIG. 1 as comprising two relatively thin walls 266 and 268, coupled to each other by rigid struts 270) will help the wall 260 remain perpendicular to the main axis of the interior cylindrical wall 236, without jamming. To further assist in keeping the wall perpendicular to cylindrical wall 236, projections or tracks 262 can be placed around the internal surface of interior wall 236, to interact with accomodating projections or tracks around the periphery of movable wall 260.

In another preferred embodiment, shown in FIG. 7, a tank car assembly 300 is shown wherein a piston-type movable wall 310 is coupled to a rigid rod or pipe 312, which is driven by an external power supply 314 to eject a solid cargo plug from tank car 300 into a receiving trough 320. In FIG. 7, the trough is shown as mounted on a rollable railway chassis 322, while the power supply 314 is shown as fixed and immovable; alternately, the receiving trough could be provided as part of a fixed installation (for example, the trough can be one component of an elevator that will lift each frozen oil or chemical plug up to the current liquid level in a large storage tank) while the power supply 314 is movable, on rail tracks or a crane or other suitable device. The tank car should be firmly restrained against the pushing force by means such as heavy cables or chains 330 on both sides, which will attach via hooks to ears or lugs 332. The standard railway coupling, used to connect rail cars to each other, preferably should not be used, and the restraining ears or lugs 332 preferably should be welded directly to cylindrical tank 334 rather than to chassis 336, to avoid generating large shearing or bending forces in any of the structural components used to secure the tank 334 to the chassis 336. Forces imposed on the receiving trough 320 as it receives the plug will be much smaller, and if the receiving trough is mounted on a railway chassis 322, as shown, it may be adequate to couple the receiving trough chassis 322 to the tank car using a standard railway coupling.

After the solid plug has been ejected from a tank car, it can be thawed or otherwise treated or processed in any desired manner.

Various alternative or supplemental mechanical systems can be used to drive a movable wall inside a cylindrical tank, if desired. For example, three or more threaded driving screws can be spaced around the periphery of the wall (120 degrees apart if three screws are used, 90 degrees apart if four screws are used, etc.), with an additional screw located at the center of the wall if desired. Each driving screw would pass through a threaded hole which passes through the movable wall or through a peripheral attachment (such as a lug or ear that extends outwardly and rides inside a track). As the screws are forcibly rotated, the threaded engagements will force the wall to move in a linear manner through the cylinder. The rotation of the screws should be securely coupled using gears or a chain and sprocket arrangement, to ensure that the screws rotate in unison.

As another approach, chains or cables can be used in a similar manner to pull the wall, instead of using driving screws to push the wall.

As yet another option, screws or chains can be used in conjunction with hydraulic or pneumatic pressure. Such overlapping components might provide a balanced approach that would minimize the pressures that would need to be generated and held inside the tank assembly, while also providing a system for ensuring that the moving wall remains perpendicular to the tank axis and will not become jammed. This approach would also eliminate the need for a relatively thick movable wall, which would reduce the weight of the tank car and increase its cargo capacity.

This approach may also eliminate the need for a movable rigid wall inside the tank. If hydraulic or pneumatic pressure is applied to one end of a frozen plug of cargo, and if that pressure is effectively trapped at the closed end of the cargo tank (the maximum possibly distance away from the open end of the tank), there is relatively little likelihood that the air, water, or other pressurized fluid will be able to immediately channel along the entire length of the tank and escape through the open end. Accordingly, it should be able to exert sufficient pressure against the end of the solidified plug to initiate movement and to force the plug a substantial distance along the length of the tank. As the plug travels along the length of the tank, the likelihood of channeling and loss of driving pressure gradually increases. However, by the time pressure is lost, the plug is likely to have travelled a sufficient distance to allow mechanical devices such as chains or driving screws to take over without requiring much tension. Accordingly, instead of requiring a movable rigid wall inside the tank, it may be possible to couple tension-bearing members (such as chains or driving screws) to a flexible steel net or grid which can move down the length of the tank. If this approach is taken, the closed end of the tank can be provided with an inlet for injecting pressurized air or hydraulic fluid to assist in moving the solidified cargo. In addition, if this approach is used, an inflatable bladder which expand into the shape of a pancake can also be provided, coupled to a second pressurized inlet if desired, to create an initial pressure-tight chamber between the end wall of the cargo tank and the end of the solidified plug. As soon as the plug has moved a short distance, the bladder can be deflated. This technique will ensure that pressure inside the space created by the bladder will press evenly against the end of the solidified plug, to promote movement of the plug and reduce the likelihood of channeling and pressure loss.

As an option for avoiding or coping with potential jamming of a movable wall inside the tank, the back side of the movable wall can be provided with three or more threaded attachment devices (comparable in shape to wall-mounted lightbulb sockets). Before unloading begins, steel rods with threaded tips can be passed through orifices that pass through the end wall of the tank, using rubber-padded holes to minimize pressure loss through the holes. The tips of the rods can be screwed into the threaded rod holders mounted on the movable wall. During unloading, these rods will gradually be pulled into the tank assembly, as the wall travels down the cylindrical tank. Marks on the rods which extend outside the tank will allow operators to ensure that the moving wall remains perpendicular to the tank axis during cargo ejection. If the moving wall becomes jammed inside the tank, the markings on the rods will indicate its direction of slant, and the exposed end of the rod that extends the farthest distance out of end wall of the tank can be hammered or otherwise driven forward into the tank, to force the moving wall back into perpendicular alignment in the tank, to eliminate the jam.

As another option, shown in FIG. 7, a movable rigid wall can be provided inside the tank, with means for rigidly coupling the wall to a driving rod or pipe 312 that will enter the tank through an orifice in the end wall. For example, a steel plate 350 with an outside diameter of approximately 25 cm (10 inches) can be bolted over an orifice 352 passing through the end wall and having a passageway diameter of about 20 cm (8 inches). This will allow passage through orifice 352 of rigid pipe 312 having a substantial diameter which will fit narrowly through the orifice 352) and having a threaded end 354, comparable to the pipe used in oil and gas drilling operations. The threads on the end of pipe 312 can be screwed into an accomodating threaded coupling 356 which is mounted on the backside 358 of the movable wall 310 inside the tank. The other end of the pipe will be coupled to external driving unit 314, which is provided with a device capable of rotating the pipe 312 in either direction, to engage or disengage it from the movable wall 310. Use of a driving pipe having a substantial diameter, in conjunction with a closable orifice passing through the end wall of the tank car, would provide maximal external control over the movement of the movable wall inside the tank car.

As another option, which will enable the use of this system with a wide variety of existing tank cars having non-cylindrical bottom surfaces that would render it difficult or impossible to eject a solid cargo plug from the tank, an accomodating bottom support device can be inserted into the tank through the open end wall of the tank. For example, in a tank car with a sloped bottom surface and a center sump basin, a steel trough device can be fabricated by means such as welding, to provide an oil-contacting surface shaped as a smooth cylindrical trough, resting on structural supports that will fit in a secure and accomodating manner in the bottom of the tank car. This device can be inserted into the tank when the tank is empty, through an open end wall. Once in place, it will provide a cylindrical or other longitudinally linear bottom surface for an oil plug to slide out across. This surface can be regarded as a "false bottom" or "removable trough." If desired, this type of insertable device can be provided with steam tubes for heating the oil-contacting surface of the false-bottom removable trough. As another alternative, a similar type of accomodating false-bottom structure can be used to protect steam tubes which are welded to the inside bottom surface of a tank car. By filling the gaps between steam tubes, this type of false bottom can allow a solid plug of congealed cargo to be slid out of the tank without imposing any shear forces on the steam tubes. Either type of false bottom can be left in place permanently or removed when not needed, such as during summer months.

Alternately or additionally, a larger cylindrical structure can inserted into an empty tank car through an open end wall. This structure can carry a movable end wall, a set of tracks for the movable wall, and the mechanical components necessary to drive the wall for ejecting a frozen or congealed cargo plug from the tank. For example, the mechanical system could provide access to one or more pressure hoses, for applying hydraulic or pneumatic pressure to the back side of the movable wall; the ends of the pressure hoses will be exposed when the movable end wall of the tank car is opened. Alternately, an insertable mechanical system can provide access to chains or driving screws that can be used to pull the movable wall toward the open end wall during unloading.

Figure 8:
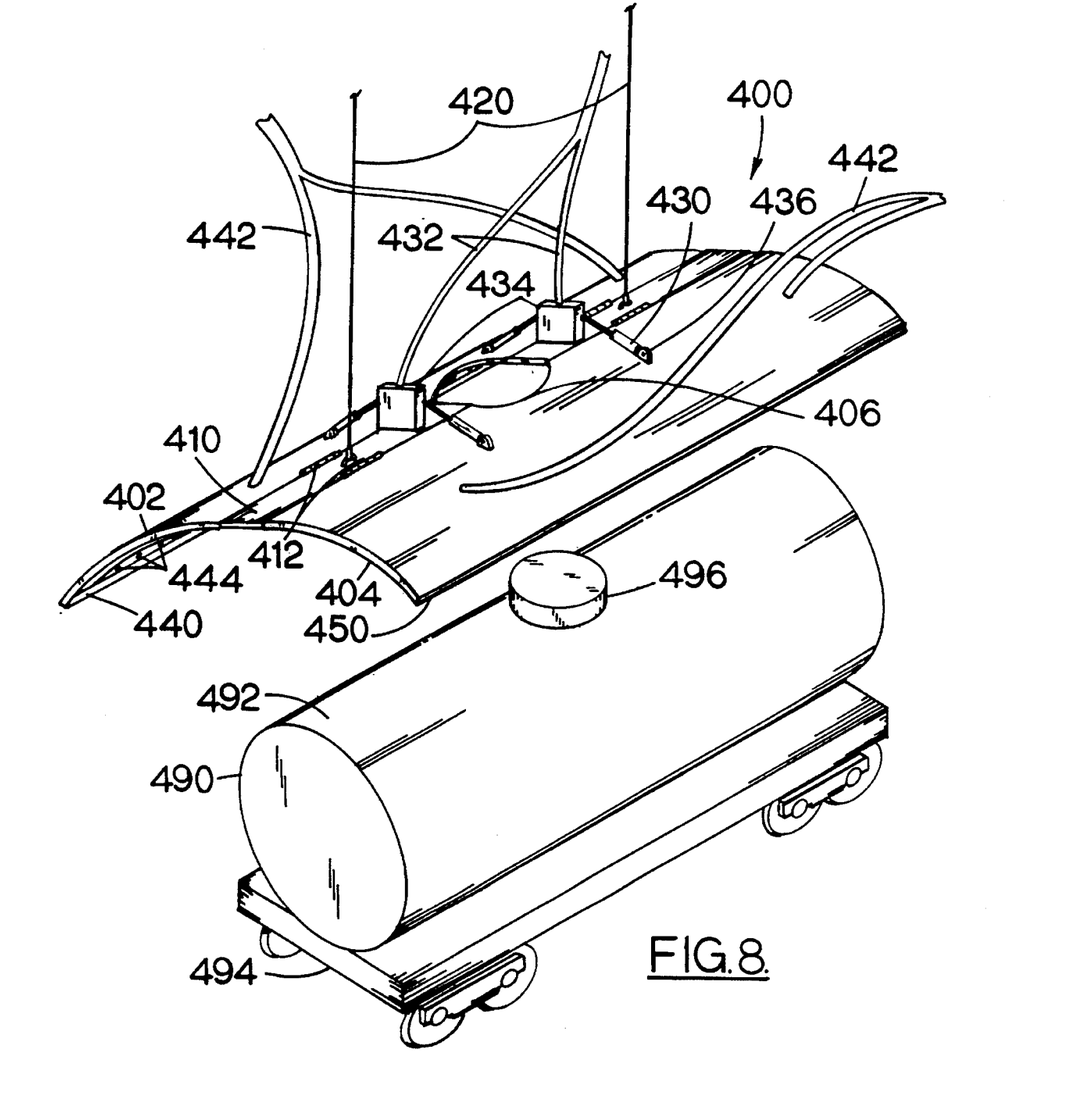
FIG. 8 is a perspective view of a crane-mounted device being lowered over a railroad tank car to facilitate thawing of a thin outer layer of cargo.

Another preferred embodiment for carrying out the partial thawing step described herein is shown in FIG. 8, which depicts a crane-mounted device 400 being lowered over a railroad tank car 490. The crane mounted device comprises a first curved heating wall 402 and a second curved heating wall 404, which can be hinged directly to each other if desired, or to a relatively narrow horizontal center plate 410 (as shown in FIG. 8) using hinges 412. The center plate 410 and walls 402 and 404 are supported by chains or cables 420, controlled by a powered winch mounted on an overhead supporting structure such as a crane or derrick. This allows the device 400 to be lowered over a tank car 490 which has been rolled into place, so that device 400 will rest on top of the tank car. After the thawing step has been completed, the device 400 is raised again so that tank car 490 can be rolled away.

In one preferred embodiment, the lowering step is carried out while heating walls 402 and 404 are in a raised position, as shown, until center plate 410 rests on top of the tank car 490. Next, a set of symmetrically-mounted control devices 430 (such as hydraulic drivers supplied by hydraulic fluid hoses 432, or by a rack-and-pinion system, chains, etc.) are extended to lower heating walls 402 and 404. The control devices 430 are coupled to center plate 410 via attachment devices 434, and to heating walls 402 and 404 via lifting lugs 436. The two heating walls are lowered until they contact and effectively wrap around most of the accessible regions of the longitudinal side wall 492 of tank car 490.

Alternately, if the primary lifting chains or cables are positioned on the two heating walls 402 and 404 at a location comparable to lifting lugs 436, then the primary lifting cables or chains can be used to provide opening and closure of heating walls 402 and 404 around a tank car 490. If desired, the outermost edges of heating walls 402 and 404 can be fitted with grappling devices that can be used to manually secure the movable hetaing walls to tank car 490 during closure, and to raise the heating walls after the thawing step has been completed, to facilitate opening and lifting of the heating walls away from the tank car 490.

Heating walls 402 and 404 can be designed to avoid the tank car chassis 494 by limiting the length of the curved heating walls; they can also be provided with an orifice 406 to avoid the tank car loading inlet 496. The walls should also be designed to accommodate any other interfering components mounted on the exterior of tank car 490.

Proper enclosure of heating walls 402 and 404 around the curved tank wall 492 can be assisted by providing a raised border 440 of steam-resistant foam or other resilient cushioning material around the periphery of each heating wall 402 or 404. During closure and heating, these raised border segments 440 will press against tank wall 492, thereby creating an enclosed space with relatively narrow clearance between the heating walls 402 and 404 and tank wall 492. To carry out the partial thawing step, steam or hot water is pumped into the enclosed space between tank wall 492 and heating walls 402 or 404, via steam hoses 442 which convey the hot fluid to a set of spaced steam outlets 444 which are distributed around the interior surfaces of heating walls 402 and 404. If desired, the lower edges 450 of heating walls 402 and 404, and the chassis bed of tank car 490, can be provided with drainage troughs to channel condensed water away from the tank and chassis bed for recycling or disposal, to minimize any contact of water with various components on the tank, wheels, and chassis bed of tank car 490 and with the railroad tracks.

Thus, there has been shown and described a new and useful means for unloading cold congealed cargo from tank cars. Although this invention has been exemplified for purposes of illustration and description by reference to certain specific embodiments, it will be apparent to those skilled in the art that various modifications and alterations of the illustrated examples are possible. Any such changes which derive directly from the teachings herein, and which do not depart from the spirit and scope of the invention, are deemed to be covered by this invention.

We claim:

1. A method for unloading a cold solidified oil or chemical cargo load from a tank car, comprising the steps of:

a. providing a tank car mounted upon a wheeled chassis for land transportation, wherein the tank car comprises an approximately cylindrical cargo tank enclosed within a longitudinal wall, a first end wall, and a second end wall which can be temporarily opened and moved to a non-obstructing position, thereby providing an opening which allows ejection of the cold solidified cargo from the tank while the cargo remains in a solidified state;

b. heating a substantial portion of the longitudinal tank wall to an extent that generates a layer of melted liquified oil or chemical immediately adjacent to the longitudinal tank wall without causing substantial thawing of remaining cargo which remains in solidified form surrounded by the layer of liquified fluid;

c. applying sufficient force to a first end of the cold solidified cargo to eject the cold solidified cargo out of the cargo tank through the opening created by movement of the second end wall away from the longitudinal wall, wherein the cold solidified cargo is received by a suitable receiving device positioned at a height which minimizes bending forces from being imposed on the longitudinal wall of the cargo tank during ejection of the cold solidified cargo from the cargo tank.

2. The method of claim 1, wherein force is applied to the first end of the cold solidified cargo by applying hydraulic or pneumatic pressure to an enclosed pressure-tight chamber positioned inside the first end of the cargo tank.

3. The method of claim 2, wherein force is applied to the first end of the cold solidified cargo by using an external driver to push a movable piston through the tank.

4. The method of claim 1, wherein the longitudinal tank wall is heated by means of a plurality of heating belts which contact the longitudinal tank wall.

5. The method of claim 4 wherein the heating belts transfer heat to the longitudinal tank wall by means selected from the group consisting of:

a. passage of heated fluid through flow channels which pass through the heating belts; and, b. passage of electrical current through electrical resistance heating elements in the heating belts.

6. The method of claim 1 wherein the longitudinal tank wall is heated by passing heated fluid through an annulus between the longitudinal wall of the cargo tank and a second wall positioned outside of the longitudinal wall.

* * * * *